United States Patent [19]
Uda et al.

[11] Patent Number: 5,565,537
[45] Date of Patent: Oct. 15, 1996

[54] MALEIMIDE-BASED COPOLYMER AND PROCESS FOR PRODUCING IT

[75] Inventors: Kimio Uda; Fumioki Shimoyama; Kazumi Fujioka, all of Hyogo, Japan

[73] Assignee: Nippon Shokubai Co., Ltd., Osaka, Japan

[21] Appl. No.: 466,664

[22] Filed: Jun. 6, 1995

Related U.S. Application Data

[63] Continuation of Ser. No. 73,687, Jun. 9, 1993, abandoned.

[30]  Foreign Application Priority Data

Jun. 17, 1992  [JP]  Japan ..................................... 4-157662
Oct. 21, 1992  [JP]  Japan ..................................... 4-283010

[51] Int. Cl.$^6$ ........................ C08F 222/40; C08F 212/06; C08F 218/02; C08F 220/06
[52] U.S. Cl. ........................ 526/262; 526/347; 526/292.1; 526/273; 526/318; 526/318.2; 526/317.1; 526/328.5; 526/330; 526/332; 526/342
[58] Field of Search ..................................... 526/262, 347, 526/273, 292.1, 317.1, 318, 318.2, 328.5, 330, 332, 342

[56]  References Cited

U.S. PATENT DOCUMENTS

| | | | |
|---|---|---|---|
| 4,816,523 | 3/1989 | Tsujimoto et al. ...................... | 525/380 |
| 5,118,270 | 6/1992 | Keiler et al. . | |
| 5,208,307 | 5/1993 | Doi et al. ................................ | 526/262 |

FOREIGN PATENT DOCUMENTS

| | | |
|---|---|---|
| 0102122 | 3/1984 | European Pat. Off. . |
| 0176328 | 4/1986 | European Pat. Off. . |
| 0188905 | 7/1986 | European Pat. Off. . |
| 0355624 | 2/1990 | European Pat. Off. . |
| 0463612 | 1/1992 | European Pat. Off. . |
| 0497282 | 8/1992 | European Pat. Off. . |
| 0509459 | 10/1992 | European Pat. Off. . |
| 2245674 | 4/1975 | France . |
| 2322723 | 4/1977 | France . |
| 50-40687 | 4/1975 | Japan . |
| 50-40688 | 4/1975 | Japan . |
| 57-49603 | 3/1982 | Japan . |
| 57-135814 | 8/1982 | Japan . |
| 58-162616 | 9/1983 | Japan . |
| 59-58006 | 4/1984 | Japan . |
| 59-126411 | 7/1984 | Japan . |
| 61-276807 | 12/1986 | Japan . |
| 62-112612 | 5/1987 | Japan . |
| 62-129334 | 6/1987 | Japan . |
| 62-138510 | 6/1987 | Japan . |
| 63-89806 | 4/1988 | Japan . |
| 63-147501 | 6/1988 | Japan . |
| 2-51514 | 2/1990 | Japan . |
| 3-49925 | 3/1991 | Japan . |
| 3-205411 | 9/1991 | Japan . |
| 5-86112A | 4/1993 | Japan . |
| 1467045 | 3/1977 | United Kingdom . |
| 9015100 | 12/1990 | WIPO . |
| 9203270 | 3/1992 | WIPO . |

OTHER PUBLICATIONS

Database WPIL Week 8820, Derwent Publications Ltd., London, GB; AN 88–136374 & JP–A–63 077 904 (Denki Kagaku Kogyo KK) Apr. 8, 1988 Abstract.
Industrial & Production Engineering vol. 11, No. 3, pp. 128–132, 1987.
Effect Of Cross–Link Density Of Modification Of Epoxy Resin By N–Phenylmaleimide–Styrene Copolymers–Eur. Polym. J. vol. 29, No. 8, pp. 1103–1113, 1993.
Toughening Of Epoxy Resins By N–Phenylmaleimide–Styrene Copolymers–Eur. Polym. J. vol. 28, No. 12, pp. 1539–1545, 1992.
Chemical Abstracts vol. 118, p. 71, 82440k (1993).
Chemical Abstracts vol. 119, p. 53, 181950d (1993).

*Primary Examiner*—Joseph L. Schofer
*Assistant Examiner*—Wu C. Cheng
*Attorney, Agent, or Firm*—Armstrong, Westerman Hattori, McLeland & Naughton

[57]  ABSTRACT

This invention provides a maleimide-based copolymer in which, because its molecular weight-retention ratio at high temperature is high, deterioration of physical properties by heating is little. Also, this invention provides a process wherein a maleimide-based copolymer is arranged so as not to heat more than necessity and thereby a maleimide-based copolymer containing only a small amount of residual volatile components is efficiently obtained without deterioration of physical properties. The maleimide-based copolymer is such as having a glass transition temperature of 170° C. or higher, a weight-average molecular weight of 100,000 to 500,000, and a molecular weight-retention ratio of 90% or more when heated at 280° C. for 10 minutes. When this copolymer is produced, volatile components are separated by supplying a polymer composition containing said copolymer and volatile components to a vent type screw extruder and operating this extruder under condition of a screw rotation number of 50 to 150 rpm.

10 Claims, 2 Drawing Sheets

MALEIMIDE-BASED COPOLYMER AND PROCESS FOR PRODUCING IT

This is a continuation of application Ser. No. 08/073,687 filed Jun. 9, 1993, now abandoned.

BACKGROUND OF THE INVENTION

The present invention relates to a maleimide-based copolymer having a high glass transition temperature and being useful as a material and the like for improving various properties such as heat resistance and so forth by combining it with a molding material or thermoplastic resin. This copolymer is usually obtained by a process comprising removing volatile components (devolatilization) from a polymer composition which contains a maleimide-based copolymer and volatile components such as a solvent, an unreacted monomer, volatile by-products or volatile impurities. Therefore, the present invention also relates to a process like this.

It has been known that a maleimide-based copolymer is a thermoplastic resin having the high heat deflection temperature and the high thermal decomposition temperature and, in general, the copolymer is used to elevate heat resistance, impact resistance and molding properties of articles in which other thermoplastic resins are used.

The maleimide-based copolymer is usually produced by copolymerizing a maleimide-based monomer with another monomer capable of copolymerizing with the maleimide-based monomer.

Physical properties of the maleimide-based copolymer are affected by proportion of the maleimide-based monomer unit in structure and, if the proportion is low, heat resistance becomes low, so that a resin composition may not obtain sufficient heat resistance and also, if the proportion is too high, molding and processing properties become worse and impact resistance may decrease.

A copolymer having relatively small proportion of the maleimide-based monomer unit is generally prepared by emulsion polymerizing or suspension polymerization. According to the emulsion polymerization, a maleimide-based copolymer having high proportion of the maleimide-based monomer unit is hard to soften and very difficult to recover from an emulsion and, therefore, a copolymer having low proportion of the maleimide-based monomer unit has been produced. Then, a copolymer obtained from the emulsion polymerization is not preferable because it shows low impact resistance by an effect of a residual emulsifier etc. and badly colors in the course of molding. In the case of suspension polymerization, an aromatic vinyl-based monomer and a maleimide-based monomer are liable to form an alternating copolymer and, therefore, when a copolymer having high proportion of the maleimide-based monomer unit is attempted to obtain, heterogeneous copolymers of different composition are liable to form. In the solution polymerization and bulk polymerization, there have been carried out several attempts to obtain a copolymer in which the amount of unreacted maleimide-based monomer is decreased by a maturing reaction, or to obtain a polymer, in which component distribution in every molecular weight division is narrow and the amount of unreacted maleimide-based monomer is small, by using a defined polymerization process.

The maleimide-based copolymer is obtained in dissolved condition in the case of the solution polymerization or bulk polymerization and obtained in dispersed condition in the case of the emulsion polymerization or suspension polymerization. It is necessary to obtain the maleimide-based copolymer by separating volatile components such as a solvent, an unreacted monomer, volatile by-products or volatile impurities from the above conditions. The reason is that, if the volatile components such as a solvent, an unreacted monomer and so forth remain in the maleimide-based copolymer, there occur deterioration of physical properties such as heat resistance and so forth as well as inferior outside appearance (silver streaks) of a molding, so that physical properties of the molding are much deteriorated.

Because of this, in the case of the emulsion polymerization and suspension polymerization, there has been adopted a method comprising separating polymers by coagulating and filtering processes, steam stripping, and so forth (refer to Japanese Official Patent Provisional Publications No. showa 62-112612 and 62-138510). On the other hand, in the case of solution polymerization and bulk polymerization, the polymers have been separated by a method comprising removing a solvent and an unreacted monomer with extraction by placing the reaction solution, obtained from finish of the polymerization, into another solvent which dissolves the solvent and unreacted monomer but does not dissolve the maleimide-based copolymer to be recovered (refer to Japanese Official Patent Provisional Publication No. showa 58-162616), a method comprising extracting a polymer in melted condition after the unreacted monomer and solvent are evaporated by using a flash evaporator (refer to Japanese Official Patent Provisional Publications No. showa 61-276807, heisei 3-205411, and showa 62-129334), or by other conventional methods.

There has been known a method comprising supplying a reaction mixture resultant from finish of the polymerization to a vent type extruder directly or after drying the mixture by heating beforehand, and thereby forming the polymer into pellets while removing volatile components (while carrying out devolatilization) (refer to Japanese Official Patent Provisional Publications No. showa 59-126411, 59-58006, 57-135814, 50-40688, 57-49603, 50-40687, 63-147501, and heisei 3-49925). Such a method is also used as a method for producing a maleimide-based copolymer (refer to Japanese Official Patent Provisional Publications No. heisei 2-51514 and showa 63-89806).

SUMMARY OF THE INVENTION

A maleimide-based copolymer having a glass transition temperature exceeding 170° C. is generally high in thermal decomposition temperature and superior in thermal stability, but it is very high in melt viscosity, and therefore the maleimide-based copolymer needs to be handled at a higher temperature than conventional plastics such as polystyrene, polymethyl methacrylate and so forth. Especially, when kneading, molding and so forth are carried out, in order to transfer the polymer in melted condition, it is necessary to lower the viscosity of the polymer by heating it up to 300° C. or higher. Even a polymer superior in thermal stability colors, lowers in molecular weight or thermally deteriorates if it is handled for a long time at such a high temperature as that the viscosity becomes low.

Therefore, it is the first object to provide a maleimide-based copolymer which has no problems like the above-mentioned and is excellent in physical properties.

Next, in the aforementioned drying method wherein a conventional flash evaporator is used, processes are made so as to melt a thermoplastic polymer with heating after flashing and to discharge the polymer with a gear pump and so forth. However, the viscosity is still high and extraction cannot be carried out in stable condition. In the aforementioned method comprising extraction by a solvent to remove volatile components, processes of washing a thermoplastic polymer after the extraction and filtering followed by drying the polymer are required, and in addition, a process of separating by distillation to recover a large amount of solvent is required, so that the processes are complex.

In other methods for devolatilization, a polymer deteriorates or by-products are formed, because a long time is required to raise temperature of the polymer, because non-volatile portions obtained from the devolatilization are transferred in condition of a high viscosity fluid, or because the polymer stays at a high temperature for a long time.

It is the second object of the present invention to provide a process by which volatile components can be efficiently removed from a maleimide-based copolymer composition containing volatile components, such as a polymerization reaction solution or the like, and by which a maleimide-based copolymer containing only a small amount of residual volatile components can be obtained without deterioration of physical properties which may occur by heating a high melt viscosity-having a maleimide-based copolymer more than necessity.

The inventors extensively examined a maleimide-based copolymer having few problems like the above-mentioned and experimentally confirmed that, if a maleimide-based copolymer has a glass transition temperature of 170° C. or higher and a weight-average molecular weight of 100,000 to 500,000, the copolymer has superior physical properties such as heat resistance and so forth, and that, if its molecular weight-retention ratio when heated at 280° C. for 10 minutes is 90% or more, deterioration of physical properties owing to heating when carrying out kneading, molding and so forth is suppressed.

Accordingly, to solve the first object, the present invention provides a maleimide-based copolymer in which a glass transition temperature is 170° C. or higher, a weight-average molecular weight is in a range of 100,000 to 500,000, and a molecular weight-retention ratio when heated at 280° C. for 10 minutes is 90% or more.

Also, the inventors examined the above-mentioned various methods for devolatilization and developed research with an idea that: in order to efficiently carry out devolatilization of a maleimide-based copolymer composition containing volatile components, a method comprising treating the maleimide-based copolymer composition with a vent type extruder is appropriate from viewpoints of its relatively simple process, no use of a large amount of solvent, and no need of heating the copolymer at a high temperature for a long time.

As seen in the curve (A) (which is drawn by a solid line) in FIG. 2, in a case of heating a maleimide-based copolymer, when temperature reaches its thermal decomposition temperature $T_1$, the copolymer decomposes and its average-molecular weight (Mw) lowers, so that physical properties deteriorate. If the decomposed copolymer is further heated, it decomposes again at the temperature $T_2$ higher than the above-mentioned, so that physical properties further deteriorate. If devolatilization of a maleimide-based copolymer composition containing volatile components is carried out by not very heating similarly to the aforementioned extraction method by solvent, a maleimide-based copolymer is obtained in condition that its molecular weight is still high without having suffered thermal decomposition. A copolymer like this is liable to deteriorate in physical properties owing to thermal decomposition like the above-mentioned at the usual heating temperature when carrying out kneading, molding and so forth, so that a product having the desired physical properties is hard to obtain, which is unfavorable. On the other hand, in a case of using a vent type extruder equipped with a screw and carrying out devolatilization of said maleimide-based copolymer composition, although depending upon a screw rotation number, a maleimide-based copolymer is heated at the temperature higher than its decomposition temperature in the inside of the extruder owing to shear heat and thereby decomposes. A maleimide-based copolymer having once suffered thermal decomposition, as seen in the curve (a-1) (which is drawn by a broken line) in FIG. 2, does not thermally decompose thereafter as far as it is not heated at the higher temperature. However, if a screw rotation number is too high, the temperature of the copolymer becomes too high and its molecular weight becomes too low, so that physical properties deteriorate too much. Therefore, the inventors further studied, so that they confirmed the following by experiments and completed the present invention.

If the lower limit of a screw rotation number is set at 50 rpm, devolatilization can be carried out sufficiently and, as mentioned above, a maleimide-based copolymer is heated at the temperature higher than its decomposition temperature in the inside of the extruder owing to shear heat and thereby decomposes. Because a maleimide-based copolymer having once suffered thermal decomposition does not thermally decompose thereafter as far as it is not heated at the higher temperature, this copolymer is hard to deteriorate at the usual heating temperature when carrying out kneading, molding and so forth. Furthermore, if the upper limit of a screw rotation number is set at 150 rpm, it becomes possible to obtain a maleimide-based copolymer having not too low molecular weight and excellent physical properties.

Accordingly, to solve the above-mentioned second object, the present invention provides a process for producing a maleimide-based copolymer, comprising removing volatile components by treating a polymer composition containing both of a maleimide-based copolymer having a glass transition temperature of 170° C. or higher and the volatile components with a vent type screw extruder. This process is characterized in comprising operating the aforementioned extruder under conditions where a screw rotation number is in a range of 50 to 150 rpm.

In the present invention, the glass transition temperature of the maleimide-based copolymer is a value measured by using a differential scanning calorimeter.

The maleimide-based copolymer having a glass transition temperature of 170° C. or higher is produced, for example, by copolymerizing a maleimide-based monomer with another monomer capable of copolymerizing.

A maleimide-based copolymer having an aromatic vinyl-based monomer unit and a maleimide-based monomer unit as main components is preferable because it is superior in heat resistance, processing property, and impact resistance as well as heat stability and because a copolymer having a glass transition temperature of 170° C. or higher, preferably 180° C. or higher is easily obtained by changing a composing ratio of each monomer unit. In a case of a polymer having a glass transition temperature lower than 170° C., volatile components can be removed by a conventional method for devolatilization.

It is preferable that a maleimide-based copolymer of the present invention is composed of 35 to 70 wt. % of an aromatic vinyl-based monomer unit, 30 to 65 wt. % of a maleimide-based monomer unit, and 0 to 20 wt. % of another monomer unit (with the proviso that a total of these monomer units is 100 wt. % and, in the present specification, the term "wt. %" means "% by weight"). If proportion of the aromatic vinyl-based monomer unit is less than the above range, molding and processing properties and impact resistance may be inferior and, if this proportion is more than the above range, heat resistance may be inferior. If proportion of the maleimide-based monomer unit is less than the above range, heat resistance may be inferior and, if this proportion is more than the above range, molding and processing properties and impact resistance may be inferior.

The amount of residual volatile components in a maleimide-based copolymer is preferably 2000 ppm or smaller, more preferably 1000 ppm or smaller, and most preferably 500 ppm or smaller. If the amount of volatile components is larger than 2000 ppm, there may occur deterioration of physical properties such as heat resistance and so forth as well as inferior outside appearance (silver streaks) of a molding, so that physical properties of the molding may much deteriorate.

A method for determining the amount of residual volatile components in a maleimide-based copolymer is not especially limited, but, for example, there are cited a method comprising dissolving a maleimide-based copolymer into a proper solvent such as chloroform and the like and quantitatively measuring the volatile components by gas chromatography and cited other conventional methods.

A maleimide-based copolymer is produced by copolymerizing an aromatic vinyl-based monomer (a) and a maleimide-based monomer (b) or by copolymerizing the monomers (a) and (b) with another monomer (c) capable of copolymerizing.

The aromatic vinyl-based monomer (a) is a compound shown by the below-described formula ①.

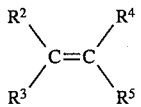

(In the formula, each of $R^2$, $R^3$, and $R^4$ independently denotes a hydrogen atom or an alkyl group with a carbon number of 1 to 5, $R^5$ denotes an aryl or substituted aryl group.)

Examples of the monomer (a) are styrene; alkylstyrenes such as o-methylstyrene, m-methylstyrene, p-methylstyrene (these o-, m-, and p-methylstyrene may be said as vinyltoluenes), 1,3-dimethylstyrene, 2,4-dimethylstyrene, ethylstyrene, p-tertiary-butylstyrene, and the like; α-methylstyrene, α-ethylstyrene, α-methyl-p-methylstyrene; vinylnaphthalene; halogenated styrenes such as o-chlorostyrene, m-chlorostyrene, p-chlorostyrene, 2,4-dibromostyrene, and the like; halogenated alkylstyrenes such as 2-methyl-4-chlorostyrene and the like; divinylbenzene; and others. One kind or two or more kinds in combination of these compounds can be used. From a standpoint of balancing between productivity and physical properties, it is hoped to use at least one kind selected from a group consisting of styrene, vinyltoluene, and α-methylstyrene. Besides, if an aliphatic vinyl-based monomer is used instead of the aromatic vinyl-based monomer, the monomer reactivity is low and also, an obtained copolymer shows low heat resistance and is highly hygroscopic.

The maleimide-based monomer (b) is a compound shown by the below-described formula ②.

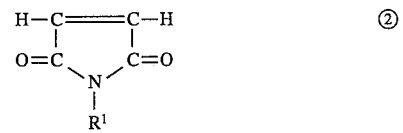

(In the formula, $R^1$ denotes a hydrogen atom or an alkyl, cycloalky, substituted alkyl, aryl or substituted aryl group with a carbon number of 1 to 15.)

Examples of the monomer (b) are maleimide, N-methylmaleimide, N-ethylmaleimide, N-propylmaleimide, N-isopropylmaleimide, N-butylmaleimide, N-isobutylmaleimide, N-tertiary-butylmaleimide, N-cyclohexylmaleimide, N-phenylmaleimide, N-chlorophenylmaleimide, N-methylphenylmaleimide, N-bromophenylmaleimide, N-naphthylmaleimide, N-laurylmaleimide, 2-hydroxyethylmaleimide, N-hydroxyphenylmaleimide, N-methoxyphenylmaleimide, N-carboxyphenylmaleimide, N-nitrophenylmaleimide, N-benzylmaleimide, and the like. One kind or two or more kinds in combination of these compounds can be used. Especially, it is preferable to use either one or both of phenylmaleimide and cyclohexylmaleimide because commercial availability is good and a copolymer superior in heat resistance is obtained.

As occasion demands, another vinyl-based monomer (c) capable of copolymerizing with the monomers (a) and (b) can be used to produce the above-mentioned maleimide-based copolymer. The monomer (c) is a compound having an ethylenic unsaturated bond other than the monomers (a) and (b) and it is used, for example, in order to elevate impact resistance, solvent resistance, and compatibility. Examples of the monomer (c) are unsaturated nitriles such as acrylonitrile, methacrylonitrile, ethacrylonitrile, phenylacrylonitrile, and the like; (meth)acrylic acid esters having an alkyl group of carbon number 1 to 18 including a cycloalkyl group and a benzyl group (for example, methyl (meth)acrylate, ethyl (meth)acrylate, butyl (meth)acrylate, isobutyl (meth)acrylate, tertiary-butyl (meth)acrylate, amyl (meth)acrylate, isoamyl (meth)acrylate, octyl (meth) acrylate, 2-ethylhexyl (meth)acrylate, decyl (meth)acrylate, lauryl (meth)acrylate, cyclohexyl (meth)acrylate, benzyl (meth)acrylate, hydroxyethyl (meth)acrylate, hydroxypropyl (meth)acrylate, polyethylene glycol mono(meth)acrylate, and the like); olefins such as ethylene, propylene, isobutylene, diisobutylene, and the like; dienes such as butadiene, isoprene, and the like; vinyl halogenides such as vinyl chloride, vinylidene chloride, vinyl bromide, vinyl fluoride, and the like; vinyl ethers such as methyl vinyl ether, butyl vinyl ether, and the like; vinyl esters of saturated monocarboxylic acids such as vinyl acetate, vinyl propionate, and the like; allyl or methallyl esters of saturated aliphatic monocarboxylic acids such as allyl acetate, allyl propionate, and the like; polyvalent (meth) acrylates such as ethylene glycol di(meth)acrylate, diethylene glycol di(meth)acrylate, diallyl phthalate, trimethylolpropane tri(meth)acrylate, pentaerythritol tetra(meth)acrylate, dipentaerythritol hexa(meth)acrylate, dimethacrylates of addition compounds of bisphenol A with ethylene oxide or propylene oxide, di(meth)acrylates of addition compounds of halogenated bisphenol A with ethylene oxide or propylene oxide, tri(meth)acrylates of isocyanurate, di- or tri(meth)acrylates of addition compounds of isocyanurate with ethylene oxide or propylene oxide, and the like; polyvalent allylates such as triallyl isocyanurate and the like; glycidyl (meth)acrylate, allyl glycidyl ether, (meth)acrylic acid, itaconic acid, maleic acid, fumaric acid, or half esters of these acids; and others. According to the purpose, one kind or two or more kinds in combination of these compounds are used, but the kind and amount for use may be chosen in a range which does not deviate from the purpose of the present invention.

The maleimide-based monomer (b) is a component to improve heat resistance of an obtaining copolymer. An amount for use of the monomer (b) can be changed according to the kinds and ratio of the aromatic vinyl-based monomer (a) and maleimide-based monomer (b), and there is no special problem if the monomer (b) is used in such a manner as that the glass transition temperature of an obtained copolymer reaches 170° C. or higher.

In the present invention, the volatile components are such as having volatility like a solvent, an unreacted monomer, volatile by-products or impurities. Here, the solvent may be a solvent which can be generally used in the solution polymerization and related reactions, and examples of the solvent are aromatic solvents such as toluene, xylene, ethylbenzene, and the like; ketones such as methyl ethyl ketone, methyl isobutyl ketone, and the like; dimethyl sulfoxide; dimethylacetamide; and polar solvents such as ethyl acetate and the like. In addition, water is used in a case of obtaining a polymer by the suspension polymerization or emulation polymerization. The volatile by-products contained in the maleimide-based copolymer are volatile low molecular weight substances formed in the course of reaction or volatile impurities contained in raw materials.

In the present invention, there is effectively used any model of a vent type single-, twin-, or multiple screw extruder, which is equipped with one or more pieces of screws and one or more pieces of vents arranged on the side face of a cylinder along a screw direction in sequence.

In a case of directly supplying a reaction mixture containing a large amount of volatile components for use of the vent type extruder, because of intensive foaming of the thermoplastic polymer accompanied with gasification of volatile components in the inside of the extruder, there occurs such a trouble as that the vent is blocked by the foaming polymer, so that to carry out a continuous operation for a long time becomes difficult, or due to the large amount of volatile components, large facilities are required, or because of taking a long residence time in the extruder in order to remove the large amount of volatile components, the polymer degenerates or colors. In a case like this, it is preferable that the extruder has the following constitution.

As seen in FIG. 1, the screw extruder 1 has the cylinder 10. The cylinder 10 usually comprises plural parts (barrels), and on the side face of the cylinder 10, vents are arranged. Preferable vents comprise arranging the rear vent 3 behind the part 2 which supplies a raw polymer composition and arranging a plural number, for example, two to five pieces of fore vents (in this figure, three pieces of fore vents 5a, 5b, and 5c) on a forward side, that is, on a side of the outlet 4 for a polymer which has finished devolatilization. In the arrangements like this, if the exhaust pressure is gradually lowered with proceeding of devolatilization of the polymer composition, a devolatilized ratio is much improved and the above-mentioned foaming of the maleimide-based copolymer accompanied with gasification of volatile components does not almost occur or does not occur at all, and also, it is unnecessary to make the residence time of the copolymer in the extruder long in order to remove the large amount of volatile components, which is preferable. If the number of the fore vent is one, devolatilization efficiency may very decrease, and, even if six or more pieces of fore vents are used, the devolatilization efficiency may not vary. Pressure at the rear vent 3 is in a range of 300 to 760 mmHg and pressure at the vent 5c near the polymer outlet 4 is preferably 600 mmHg or lower, more preferably 400 mmHg or lower. By lowering pressure with proceeding of solvent-removal (which means approach to the outlet), efficiency of solvent-removal can be further increased, which is preferable. Exhaust is carried out in such a manner as that the pressure at each vent part is adjusted at the defined value using a vacuum pump. In FIG. 1, numeral symbol 6 denotes a part for driving a screw, numeral symbol 7 denotes a heat exchanger, and numeral symbol 8 denotes a storage tank for the polymer composition.

In a case of producing the maleimide-based copolymer having a glass transition temperature of 170° C. or higher by bulk polymerization or solution polymerization, if an amount of the maleimide-based copolymer contained in the maleimide-based copolymer composition (here, a reaction mixture) is intended to increase, viscosity of the polymer composition increases, special facilities are required for eliminating heat generation in the course of polymerization, and transfer to the extruder becomes difficult, and therefore, a polymer composition containing volatile components in a range of 20 to 80 wt. % is preferable. If the content of volatile components in the polymer composition is lower than this range, viscosity of the composition becomes too high and handling may become difficult. If the content exceeds the range, the amount of volatile components becomes too large and volatile components remaining after solvent-removal may increase.

Devolatilization of a maleimide-based copolymer composition containing a large amount of volatile components such as the aforementioned is preferably carried out, as seen in FIG. 1, by: heating and pressuring a polymer composition by the heat exchanger 7 beforehand, transferring the polymer composition by a gear pump or the like to supply it to the vent type screw extruder 1 maintained at atmospheric pressure or reduced pressure, devolatilizing it through the vent 3 positioned behind the supply inlet 2, and then separating residual volatile components through plural vents 5a, 5b and 5c positioned in front of the supply inlet 2.

The heat exchanger 7 may be a screw extruder or a heat exchanger of a double tube type or static mixer type. The polymer composition heated by the heat exchanger 7 at a temperature of 150° to 300° C. is regulated at a pressure of 5 to 30 atm by a pressure regulator positioned at an outlet of the heat exchanger 7, and then it is supplied to the screw extruder Thereby, decrease in devolatilization efficiency, which may arise from lack of heat quantity and so on, is suppressed and in addition, the vent-up and polymer-accompaniment at the fore vents becomes hard to occur by removing a large amount of gas, which is generated from volatile components forming in a large amount, through the vent positioned behind the supply inlet. The time for treatment with the vent type screw extruder is preferably in a range of 0.5 to 30 minutes. If it is shorter than this range, the devolatilization becomes insufficient and an amount of residual volatile components may increase. If the time is longer than the above range, resin deterioration or degeneration may be liable to occur.

The most important point in the process of the present invention is a screw rotation number when volatile components being removed by a screw extruder. A polymer showing deterioration of physical properties only a little is not obtained unless operation of the extruder is carried out at a screw rotation number in a range of 50 to 150 rpm. If the screw rotation number is less than 50 rpm, volatile components remaining in the polymer increase, inferior outside appearance of a molding easily occurs, and the vent-up is apt to occur, so that treatment of the polymer composition under stable conditions becomes impossible. On the other hand, if the screw is rotated at a high speed exceeding 150 rpm, the resin temperature is raised by intensive heat generation which appears to be peculiar to a polymer having high melt viscosity and deterioration of physical properties of a polymer is caused by thermal change in quality and so on.

A barrel temperature of the screw extruder cannot be determined in sweeping generalizations because it differs with the barrel position, but the operation can be carried out preferably in a range of 100° to 350° C., more preferably in a range of 250° to 300° C. Especially, in a barrel near an outlet of the extruder where devolatilization of the maleimide-based copolymer has proceeded, the screw rotation number becomes an important factor because the resin temperature is easily elevated owing to shear heat generation from the maleimide-based copolymer.

In the barrel at a front stage of fore vent parts of one or more, an inactive gas such as steam, nitrogen, argon, helium, carbon dioxide and so on or an inactive liquid (unreactive with resin) such as water, alcohol and so on is injected with pressure into the cylinder through the injection inlets 9a, 9b, and 9c, it is mixed with the polymer composition by rotating the screw, and then separation under reduced pressure is carried out at the vent parts. Thereby the amount of residual volatile components can be further diminished. Especially, the amount for use of the inactive liquid is preferably in a range of 0.5 to 3 wt. % based on the polymer. Because the heat resistance of resins is liable to very decrease owing to residual volatile components, concerning the maleimide-based copolymer having a glass transition temperature of 170° C. or higher and being characterized in heat resistance, it is preferable to diminish the residual volatile components. The devolatilization is preferably carried out in such a manner as that the amount of residual volatile components in the polymer becomes 2000 ppm or smaller, more preferably 1000 ppm or smaller, most preferably 500 ppm or smaller. If the amount of residual volatile components is larger than 2000 ppm, heat resistance may be inferior, outside appearance of a molding may be bad, and physical properties of the molding may lower. Doing like this, a maleimide-based copolymer superior in heat stability is obtained, in which a maleimide-based monomer unit and an aromatic vinyl-based monomer unit are contained as essential components (or as main components), a weight-average molecular weight after volatile components being removed is in a range of 100,000 to 500,000, preferably 100,000 to 300,000, a molecular weight-retention ratio when heating the copolymer at 280° C. for 10 minutes is 90% or more, and the amount of volatile components is 2000 ppm or smaller.

In a case of making the polymer into pellets by a vent type extruder, it is hitherto usual that the polymer extruded into strand form is rapidly cooled with water and then cut in order to prevent coloring and thermal deterioration of the polymer from being caused by allowing the polymer to stand at high temperature for a long time. However, there are problems that, if a maleimide-based copolymer is extruded into strand form and then rapidly cooled with water, the polymer becomes hard, lowers in flexibility, and becomes fragile, and therefore, any article is impossible to produce, because the strands are easy to break and difficult to pull in stable condition, and, when cut, the strands split or the pellets suffer cracking.

For producing pellets of a maleimide-based copolymer without problems like this, it is preferable to carry out the below-mentioned process.

This process comprises:

extruding a melted maleimide-based copolymer, which is obtained by, according to the present invention, devolatilizing a polymer composition containing the maleimide-based copolymer and volatile components; from an extruder to make the copolymer into strand form;

cutting the resultant strands to make them into pellet form under conditions where said strands are cooled to a temperature range of 180° to 250° C.; and further cooling the resultant pellets to 150° C. or lower within 10 minutes after said maleimide-based copolymer being extruded.

Temperature of the maleimide-based copolymer at an outlet of a die of the extruder is not especially limited as far as it is a temperature at which the maleimide-based copolymer is in melted condition and the copolymer can be extruded into strand form. However, the temperature is preferably in a range of 250° to 320° C. The reason is that: if it exceeds 320° C., the maleimide-based copolymer may deteriorate, and, if it is lower than 250° C., it may be impossible to extrude the maleimide-based copolymer into strand form or it may be insufficient to remove residual volatile components because viscosity is too high even if the maleimide-based copolymer is in melted condition.

After finish of the devolatilization, a maleimide-based copolymer is melted condition is extruded into strand form and the resultant strands are cooled to a temperature range of 180° to 250° C. Concerning a method for cooling the strands, air-cooling is especially preferable. Because, in a case of carrying out the air-cooling, the strand-breakage caused by local rapid cooling and so forth is hard to occur. However, the cooling method is not limited to the air-cooling, and other methods such as water-cooling and so forth can be used if the cooling temperature is in the above range.

The strands cooled to the above-mentioned temperature range is cut at definite intervals with a strand cutter and so forth to make the strands into pellet form. The resultant pellets are cooled to a temperature of 150° C. or lower within 10 minutes after the maleimide-based copolymer is extruded from an extruder into strand form. Thereby, desired maleimide-based copolymer pellets are obtained. A method for cooling the pellets to a temperature of 150° C. or lower is not especially limited, and it may be either air-cooling or water-cooling and also, it may be other methods.

The maleimide-based copolymer pellets obtained as mentioned above are little in coloring, thermal deterioration and so forth. The pellets may be used by making them into powder form with a pulverizer and so forth, if necessary.

Thermal deterioration of the polymer can be evaluated from lowering of polymerization degree, coloring, and lowering of impact resistance, and so on.

The process of the present invention is characterized in that heating and devolatilization are carried out by treating the maleimide-based copolymer superior in heat resistance with operating the vent type screw extruder in the defined range of screw rotation number, and the process is effective in a point of especially suppressing decrease of the molecular weight of the polymer among several types of thermal deterioration phenomena.

A maleimide-based copolymer having a weight-average molecular weight lower than 100,000 after devolatilization is not preferable on physical properties, because its impact resistance is decreased. On the other hand, a maleimide-based copolymer having a weight-average molecular weight higher than 500,000, because of its high melt viscosity, is liable to increase the amount of residual volatile components due to a reduction of devolatilization efficiency and, if the screw rotation number is increased to enhance the devolatilization efficiency, or if an operation of raising the barrel temperature is carried out, thermal deterioration progresses and thus, coloring and a lowering of molecular weight occur, so that there is obtained a copolymer unfavorable in the aspect of physical properties.

A maleimide-based copolymer of the present invention is superior in thermal stability and, even after the copolymer is further maintained with heating at 280° C. for 10 minutes, the lowering of molecular weight does not almost occur and, when compared before heating, the copolymer has a molecular weight-retention ratio of 90% or more, preferably 95% or more.

The maleimide-based copolymer superior in thermal stability, even if solely molded, shows properties superior in heat resistance and impact resistance, and in addition, the copolymer has a characteristic that physical properties is hard to vary according to blend temperature or kneading conditions even in a case where it is blended and used with another thermoplastic resin composition. A maleimide-based copolymer, from which volatile components are removed by the process of the present invention, has the advantage that: in a case where blended and used as mentioned above, it is excellent in heat resistance and molding properties, especially in impact resistance, and physical properties of an obtained, blended product are stable.

The maleimide-based copolymer of the present invention is superior in balancing of physical properties represented by heat resistance and impact resistance and, by blending this copolymer with a resin, such as conventional plastics or engineering plastics, as an improver for these resins, the copolymer is useful for improving heat resistance or rigidity.

If a maleimide-based copolymer has a glass transition temperature of 170° C. or higher and a weight-average molecular weight in a range of 100,000 to 500,000, this copolymer is superior in physical properties such as heat resistance and so forth. Also, if a molecular weight-retention ratio when heating said copolymer at 280° C. for 10 minutes is 90% or more, deterioration of physical properties due to heating is suppressed when carrying out kneading, molding and so forth.

Therefore, a maleimide-based copolymer of the present invention is superior in physical properties such as heat resistance and so forth, little in deterioration of physical properties by heating when carrying out kneading, molding and so forth, and very superior in thermal stability.

In the present invention, because the devolatilization is carried out by supplying a polymer composition containing both of a maleimide-based copolymer having a glass transition temperature of 170° C. or higher and volatile components to the vent type screw extruder and by operating the extruder at a screw rotation number in a range of 50 to 150 rpm, a polymer showing little deterioration of physical properties is obtained.

Detailed explanation of this is as follows. If the lower limit of a screw rotation number is set at 50 rpm, devolatilization can be carried out sufficiently and a maleimide-based copolymer is heated at the temperature higher than its decomposition temperature in the inside of the extruder owing to shear heat and thereby decomposes. Because a maleimide-based copolymer having once suffered thermal decomposition does not thermally decompose thereafter as far as it is not heated at the higher temperature, this copolymer is hard to deteriorate at the usual heating temperature when carrying out kneading, molding and so forth. Also, if the upper limit of a screw rotation number is set at 150 rpm, it becomes possible to obtain a maleimide-based copolymer having not too low molecular weight and excellent physical properties.

According to the process of the present invention, because volatile components can be removed without heating the maleimide-based copolymer having high melt viscosity more than necessity, the maleimide-based copolymer containing only a small amount of residual volatile components can be efficiently obtained without deterioration of physical properties.

Also, if a maleimide-based copolymer in melted condition, obtained by devolatilization of a polymer composition containing the maleimide-based copolymer and volatile components, is extruded into strand form, if the resultant stands are cut under conditions cooled to a temperature range of 180° to 250° C. to make the strands into pellet form, and if the resultant pellets are cooled to a temperature of 150° C. or lower within 10 minutes after said extrusion of the copolymer, then, because heating of the maleimide-based copolymer at a high temperature for a long time becomes unnecessary, coloring and thermal deterioration do not occur. Also, in this case, because a cooling temperature of strands is set in a temperature range where the flexibility of the maleimide-based copolymer is maintained, the strands hardly break and can be pulled in stable condition, and in addition, when cut, the strands do not split or the pellets do not suffer cracking.

Because of this, maleimide-based copolymer pellets can be obtained without coloring, thermal deterioration, cracking and so forth and with continuous high productivity.

If the cooling temperature of strands is lower than 180° C., the maleimide-based copolymer lowers in flexibility and becomes fragile, and therefore, the strands are easy to break and can not be pulled in stable condition, or when cut, the strands split, or the pellets suffer cracking. In a case where the cooling temperature of strands is higher than 250° C., coloring and thermal deterioration of the copolymer may occur and also, there is the possibility that the copolymer is liable to adhere to a strand cutter and so forth because the strands are too soft.

Also, in a case where, even when it has passed 10 minutes after a maleimide-based copolymer was extruded into strand form, temperature of the copolymer exceeds 150° C., because the copolymer is stood at a high temperature for a long time, there is the possibility that coloring and thermal deterioration of the copolymer occur.

DESCRIPTION OF THE PREFERRED EMBODIMENTS

Figure 1:
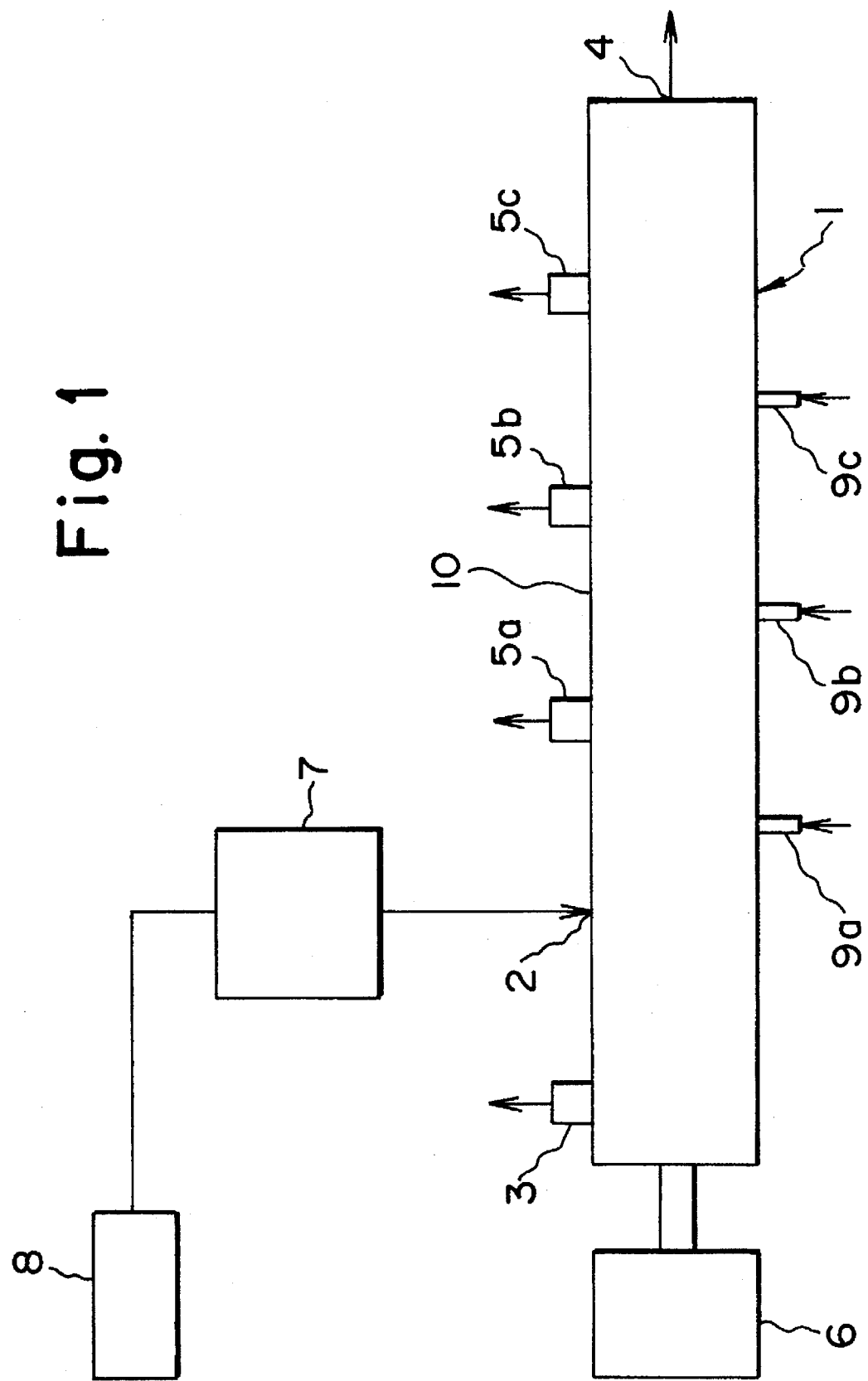
FIG. 1 is a schematic view showing one example of a vent type screw extruder used for performing the process of the present invention.
Figure 2:
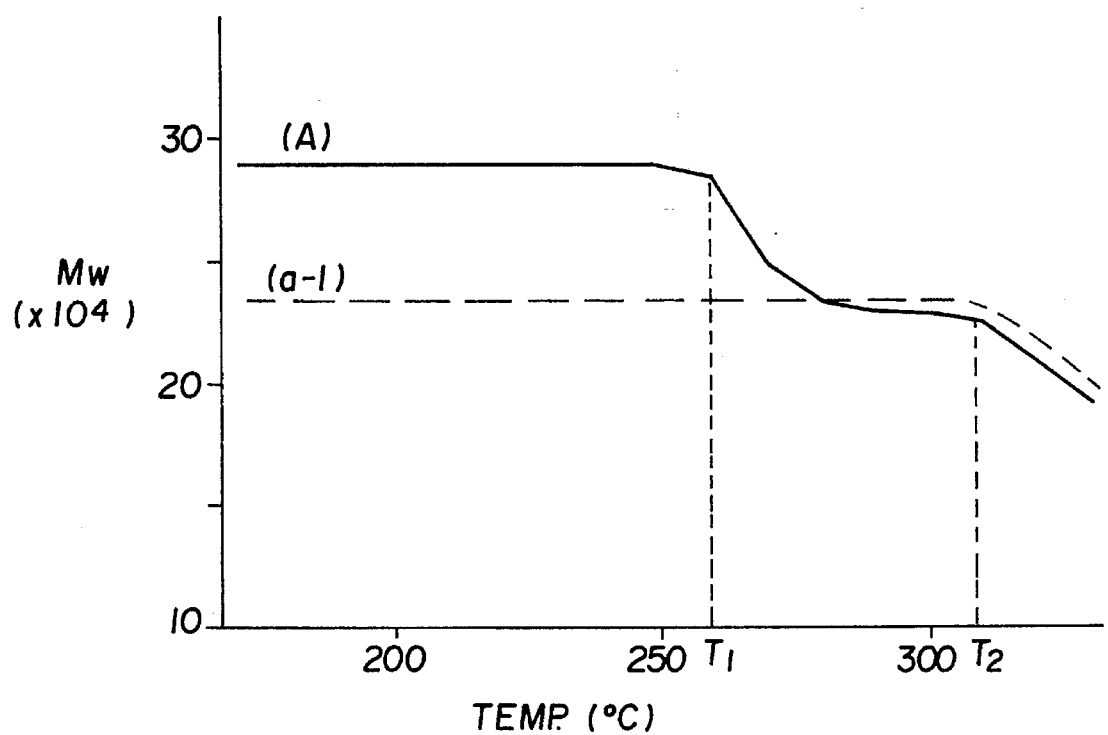
FIG. 2 is a graph showing the variation curve (A) (which is drawn by a solid line) of weight-average molecular weight (Mw) when heating a maleimide-based copolymer contained in a maleimide-based copolymer composition (A) obtained from PRODUCTION EXAMPLE 1 as well as the variation curve (a-1) (which is drawn by a broken line) of weight-average molecular weight (Mw) when heating a maleimide-based copolymer (a-1) obtained from EXAMPLE 1.

Hereinafter, practical examples and comparative examples are shown, but the present invention is not limited to the undermentioned examples. Hereinafter, the term "part(s)" means "part(s) by weight".

PRODUCTION EXAMPLE 1

Into a polymerization reaction tank equipped with a condenser, stirrer, and two dropping funnels, were charged 7.2 parts of styrene and 36.5 parts of toluene, the inside atmosphere in the reaction tank was replaced by a nitrogen gas and the temperature in the tank was warmed up to 114° C.

A reaction was initiated by adding 0.01 parts of tertiary-butylperoxy isopropylcarbonate as a polymerization initiator into the reaction tank and polymerization was carried out in refluxing conditions while a dropping solution (1), prepared beforehand and comprising 23.3 parts of N-phenylmaleimide and 15.5 parts of toluene, and a dropping solution (2), prepared beforehand and comprising 17.5 parts of styrene and 0.02 parts of tertiary-butylperoxy isopropylcarbonate, were added separately and dropwise at a constant rate during 3.5 hours. After the adding finished, heating of the reaction mixture was continued further for 1.5 hours. Thereby a maleimide-based copolymer composition (A) comprising 52.0 wt. % of toluene, 5.1 wt. % of styrene, and 42.9 wt. % of a maleimide-based copolymer was obtained. Besides, a content of N-phenylmaleimide was less than 0.05 wt. % and could not be detected. The obtained maleimide-based copolymer had a glass transition temperature of 206° C.

PRODUCTION EXAMPLE 2

The procedure of PRODUCTION EXAMPLE 1 was repeated except that: 21.1 parts of styrene and 31.9 parts of methyl ethyl ketone were charged into a polymerization reaction tank; 0.04 parts of tertiary-butylperoxy 2-ethylhexanoate was added as a polymerization initiator to the reaction tank; a dropping solution (1) comprising 19.1 parts of N-phenylmaleimide and 5.3 parts of methyl ethyl ketone was used; a dropping solution (2) comprising 22.6 parts of styrene and 0.04 parts of tertiary-butylperoxy 2-ethylhexanoate was used; polymerization temperature was set at 90° C.; and, after the dropping finished, temperature was set at 60° C. Thereby a maleimide-based copolymer composition (B) comprising 22.5 wt. % of styrene, 40.3 wt. % of a maleimide-based copolymer, and 37.2 wt. % of methyl ethyl ketone was obtained. Besides, a content of N-phenylmaleimide was less than 0.05 wt. % and could not be detected. The obtained maleimide-based copolymer had a glass transition temperature of 189° C.

PRODUCTION EXAMPLE 3

The procedure of PRODUCTION EXAMPLE 1 was repeated except that: 47.0 parts of styrene and 28.0 parts of toluene were charged into a polymerization reaction tank; 0.02 parts of tertiary-butylperoxy isopropylcarbonate was added as a polymerization initiator to the reaction tank; a dropping solution (1) comprising 11.9 parts of N-phenylmaleimide and 1.3 parts of toluene was used; a dropping solution (2) comprising 11.1 parts of styrene and 0.04 parts of tertiary-butylperoxy isopropylcarbonate was used; and, after the dropping finished, temperature was set at 60° C. Thereby a maleimide-based copolymer composition (C) comprising 31.5 wt. % of styrene, 30.0 wt. % of toluene, 38.4 wt. % of a maleimide-based copolymer, and 0.1 wt. % of N-phenylmaleimide was obtained. The obtained maleimide-based copolymer had a glass transition temperature of 153° C.

The glass transition temperature of the above-mentioned copolymers was determined by the middle point method from a DSC curve which was measured at a rising temperature speed of 5° C./minute under a nitrogen gas current using α-alumina as a reference and using the DSC-8230 model made by Rigaku Denki Co., Ltd.

EXAMPLE 1

The vent type screw extruder used was an extruder which was made by the Japan Steel Works, Ltd., had twin screws gearing with each other in the same direction and had a screw diameter (D) of 65 mm, a cylinder length (L) of 2600 mm, a L/D ratio of 40, and a vent number of 4 (one rear vent and three fore vents). Using a gear pump, the maleimide-based copolymer composition (A) obtained from PRODUCTION EXAMPLE 1 was passed through the interior of a static mixer type heat exchanger in which a heating medium of 285° C. was circulating to heat the composition (A) up to 240° C., and this composition was maintained at a pressure of 20 kg/cm$^2$ with a pressure-controlling valve and then supplied to the screw extruder which was set to operation conditions shown in Table 1. Thereby a maleimide-based copolymer (a-1) was obtained. Besides, at each front stage of the second and third vents, water was injected with pressure at a supplying rate of 7 kg/h.

EXAMPLES 2 AND 3 AND COMPARATIVE EXAMPLES 1 AND 2

The production of EXAMPLE 1 was repeated except that a temperature of the copolymer composition or operation conditions of the screw extruder were changed as shown in Table 1. Thereby maleimide-based copolymers (a-2), (a-3), (a-6), and (a-7) were obtained. Besides, at each front stage of the second and third vents, water was injected with pressure at a supplying rate of 7 kg/h.

EXAMPLES 4 AND 5

The procedure of EXAMPLE 1 was repeated except that, as the vent type screw extruder, there was used an extruder which was made by the Japan Steel Works, Ltd., had twin screws gearing with each other in the same direction and had a screw diameter (D) of 120 mm, a cylinder length (L) of 5460 mm, a L/D ratio of 45.5, and a vent number of 4 (one rear vent and three fore vents). Thereby maleimide-based copolymers (a-4) and (a-5) were obtained. Besides, water injection was carried out at a supplying rate of 60 kg/h in a manner similar to EXAMPLE 1.

EXAMPLES 6 AND 7 AND COMPARATIVE EXAMPLES 3 AND 4

The procedure of EXAMPLE 1 was repeated except that an extruder having a screw diameter (D) of 44 mm, a cylinder length (L) of 1958 mm, a L/D ratio of 45.5, and a vent number of 4 (one rear vent and three fore vents) was used and that the maleimide-based copolymer composition was, respectively, changed to (B), (C). Thereby maleimide-based copolymers (b-1), (b-2), (c-1), and (c-2) were obtained. Besides, water injection was carried out at a supplying rate of 4 kg/h in a manner similar to EXAMPLE 1.

EXAMPLE 8

The procedure of EXAMPLE 1 was repeated except that injection of an inactive liquid was not carried out. Thereby a maleimide-based copolymer (a-8) was obtained.

EXAMPLE 9

The procedure of EXAMPLE 1 was repeated except that the operation conditions of the extruder were changed as shown in Table 1. Thereby a maleimide-based copolymer (a-9) was obtained.

COMPARATIVE EXAMPLE 5

Into a polymerization reaction tank of 30 liter capacity equipped with a condenser and stirrer, were charged 45.0 parts of styrene, 55.0 parts of N-phenylmaleimide, 1.0 part of tertiary-butylperoxy 2-ethylhexanoate and 233.3 parts of a 0.2% aqueous polyvinyl alcohol solution having a saponification ratio of 98% and viscosity of 45 cps, and the inside atmosphere of the reaction tank was replaced by a nitrogen gas with stirring, so that a suspension of monomers was obtained.

Next, while retaining the suspension condition, the temperature in the tank was warmed up to 70° C. and this temperature was maintained for 2.5 hours to carry out a polymerization reaction, and furthermore, maturing was carried out by still heating at 95° C. for 2.0 hours.

The reaction products were cooled, then solid portions were separated by filtration, washed, and dried in a hot wind dryer of 100° C. Thereby a beady comparative maleimide-based copolymer (d) was obtained.

This comparative maleimide-based copolymer (d) had a structure composed of 45 wt. % of the styrene unit and 55 wt. % of the N-phenylmaleimide unit as well as had a glass transition temperature of 207° C. and a weight-average molecular weight of 230,000.

In the below-described Tables 1 and 3, numbering of the fore vents 1, 2, and 3 shows order of these vents counted from the side of an inlet for supplying the polymer composition.

Results from analyzing the amount of volatile components, weight-average molecular weight, thermal deterioration, outside appearance and molecular weight-retention ratio, for the obtained maleimide-based copolymers (a-1) to (a-5), (a-7), (a-8), (a-9), (b-1), (b-2), (c-1), (c-2) and (d), were shown in Table 2.

Also, the kind and proportion of monomer units in structure of these copolymers were analyzed, so that any one of the copolymers (a-1) to (a-5) and (a-7) to (a-9) was composed of 46 wt. % of the ST (styrene) unit and 54 wt. % of the PMI (N-phenylmaleimide) unit, any one of the copolymers (b-1) and (b-2) was composed of 53 wt. % of the ST unit and 47 wt. % of the PMI unit, and any one of the copolymers (c-1) and (c-2) was composed of 74 wt. % of the ST unit and 26 wt. % of the PMI unit.

The amount of volatile components were determined by dissolving the obtained maleimide-based copolymer in chloroform and analyzing the solvent, ST (styrene), and PMI (N-phenylmaleimide) quantitatively by gas chromatography.

The kind and proportion of monomer units in copolymer structure were determined by infrared absorption spectra, $^1$H-NMR, and elementary analyses.

The weight-average molecular weight of the copolymers was given by determining the molecular weight by gel permeation chromatography (GPC) using tetrahydrofuran (THF) as an eluate followed by checking it with a standard polystyrene.

The thermal deterioration was shown by an Izod impact strength value determined by that a maleimide-based copolymer test piece (3 m thickness) prepared by carrying out the injection molding at a cylinder temperature of 280° C. was subjected to an Izod impact strength test according to JIS K7110. As this Izod impact strength value is larger, the thermal deterioration degree is smaller.

The outside appearance of the above-mentioned test piece was observed by the naked eye.

The molecular weight-retention ratio was determined by that: using a differential scanning calorimeter, the copolymer was heated at 280° C. for 10 minutes under reduced pressure (20 mmHg or lower) conditions and then cooled rapidly, a molecular weight of the resulting copolymer was measured,

TABLE 1

| | kind of copolymer composition | supplying temperature of copolymer composition (°C.) | supplying rate of copolymer composition (kg/h) | operation conditions of screw extruder | | | | barrel-setting temperature (°C.) | screw rotation number (rpm) | injection of inactive liquid | kind of obtained maleimide-based copolymer |
|---|---|---|---|---|---|---|---|---|---|---|---|
| | | | | vent pressure (mmHg) | | | | | | | |
| | | | | rear vent | fore vent 1 | 2 | 3 | | | | |
| EXAMPLE 1 | (A) | 240 | 110 | 700 | 250 | 20 | 20 | 270 | 120 | yes | a-1 |
| EXAMPLE 2 | (A) | 240 | 110 | 700 | 250 | 100 | 100 | 270 | 100 | yes | a-2 |
| EXAMPLE 3 | (A) | 110 | 110 | 700 | 250 | 20 | 20 | 270 | 120 | yes | a-3 |
| EXAMPLE 4 | (A) | 240 | 1000 | 700 | 250 | 20 | 20 | 270 | 60 | yes | a-4 |
| EXAMPLE 5 | (A) | 240 | 1000 | 700 | 250 | 20 | 20 | 270 | 80 | yes | a-5 |
| COMPARATIVE EXAMPLE 1 | (A) | 240 | 110 | 700 | 250 | 20 | 20 | 270 | 30 | yes | a-6 |
| COMPARATIVE EXAMPLE 2 | (A) | 240 | 110 | 700 | 250 | 20 | 20 | 270 | 250 | yes | a-7 |
| EXAMPLE 6 | (B) | 220 | 40 | 700 | 250 | 20 | 20 | 270 | 120 | yes | b-1 |
| EXAMPLE 7 | (B) | 220 | 60 | 700 | 250 | 20 | 20 | 270 | 140 | yes | b-2 |
| COMPARATIVE EXAMPLE 3 | (C) | 190 | 60 | 700 | 250 | 20 | 20 | 250 | 120 | yes | c-1 |
| COMPARATIVE EXAMPLE 4 | (C) | 190 | 60 | 700 | 250 | 20 | 20 | 250 | 250 | yes | c-2 |
| EXAMPLE 8 | (A) | 240 | 110 | 700 | 250 | 20 | 20 | 270 | 120 | no | a-8 |
| EXAMPLE 9 | (A) | 240 | 50 | 700 | 250 | 20 | 20 | 270 | 120 | yes | a-9 | and a ratio of the measured molecular weight to that before the treatment was calculated.

TABLE 2

| kind of maleimide-based copolymer | physical properties of maleimide-based copolymer | | | | | | | | |
|---|---|---|---|---|---|---|---|---|---|
| | amount of volatile components (ppm/copolymer) | | | | weight-average molecular weight | Izod impact strength value | | | molecular weight-retention ratio (%) |
| | solvent | ST | PMI | total | (Mw/10⁴) | (kg.cm/cm) | outside appearance | | |
| a-1 | 180 | 150 | <50 | 330 | 23 | 1.6 | light yellow, transparent | | 100 |
| a-2 | 430 | 330 | <50 | 760 | 24 | 1.5 | light yellow, transparent | | 98 |
| a-3 | 640 | 330 | <50 | 970 | 24 | 1.5 | light yellow, transparent | | 98 |
| a-4 | 200 | 180 | <50 | 380 | 23 | 1.6 | light yellow, transparent | | 98 |
| a-5 | 170 | 130 | <50 | 300 | 22 | 1.6 | light yellow, transparent | | 99 |
| a-6 | Screw extruder could not be operated in stable condition because vent-up occurred. | | | | | | | | |
| a-7 | 120 | 80 | <50 | 200 | 8 | 1.1 | yellow brown, transparent | | 100 |
| b-1 | 80 | 340 | <50 | 420 | 10 | 1.6 | light yellow, transparent | | 100 |
| b-2 | 90 | 540 | <50 | 630 | 12 | 1.7 | light yellow, transparent | | 98 |
| c-1 | 180 | 260 | 70 | 510 | 20 | 3.3 | light yellow, transparent | | 82 |
| c-2 | 120 | 180 | 60 | 360 | 19 | 3.2 | light yellow, transparent | | 85 |
| a-8 | 450 | 390 | 60 | 900 | 21 | 1.4 | light yellow, transparent | | 98 |
| a-9 | 160 | 130 | <50 | 290 | 22 | 1.5 | light yellow, transparent | | 98 |
| d | — | 610 | <50 | 610 | 23 | 1.2 | light brown, transparent | | 72 |

As seen in Tables 1 and 2, the polymers obtained by the process of the present invention show that the amount of volatile components is small and in addition, that the molecular weight decrease and coloring of the polymers are little. Also, said polymers obtained are high in molecular weight-retention ratio and superior in thermal stability. The polymers obtained in COMPARATIVE EXAMPLES suffer thermal deterioration or are low in the molecular weight-retention ratio.

Next, the following EXAMPLES and COMPARATIVE EXAMPLES were carried out using the maleimide-based copolymer composition (A) obtained from the aforementioned PRODUCTION EXAMPLE 1 and using a vent type screw extruder equipped with twin screws gearing with each other in the same direction (made by the Japan Steel Works Ltd., screw diameter (D) of 44 mm, cylinder length (L) of 1958 mm, L/D ratio of 44.5, vent number of 4 (one rear vent and three fore vents)

EXAMPLE 10

Using a gear pump, the maleimide-based copolymer composition was passed through the interior of a static mixer type heat exchanger in order to heat the composition at 240° C., and this composition was maintained at a pressure of 20 kg/cm² with a pressure-controlling valve and then supplied to the extruder which was set to the operation conditions shown in Table 3. Thereby Volatile components were removed and then the resultant maleimide-based copolymer was extruded into strand form at a rate of 20 kg/hour from a die of 4 mm φ in diameter. The copolymer temperature at an outlet of the die was measured as 298° C.

The reasultant strands were cooled to 200° C. by air-cooling for about 5 seconds and then cut by a strand cutter to make the strands into pellet form.

The resultant pellets were compulsively cooled to 65° C. by air-cooling for 1 minute and then put into a paper bag.

The obtained maleimide-based copolymer pellets (1) were transparent and had cylindrical form. Their color tone was light yellow and weight-average molecular weight was 230,000.

EXAMPLE 11

The procedure of EXAMPLE 10 was repeated till cutting the maleimide-based copolymer having strand form to make it into pellet form. Thereafter, the resultant maleimide-based copolymer pellets were compulsively cooled to 45° C. by air-cooling for 5 minutes and then put into a paper bag.

The obtained maleimide-based copolymer pellets (2) were transparent and had cylindrical form. Their color tone was light yellow and weight-average molecular weight was 230,000.

COMPARATIVE EXAMPLE 6

The procedure of EXAMPLE 10 was repeated till extruding the maleimide-based copolymer into strand form. Thereafter, the resultant maleimide-based copolymer strands were cooled to 120° C. by immersing them in water. However, because the thus-cooled strands were liable to break, they could not be pulled in stable condition.

The cooled strands were cut by a strand cutter to make them into pellet form.

The resultant pellets were compulsively cooled to 35° C. by air-cooling for 5 minutes. Thereby comparative maleimide-based copolymer pellets (1) were obtained.

The comparative maleimide-based copolymer pellets (1) were opaque and had cracks, and a large amount of powdered matter was generated. Color tone of the pellets was light yellow and weight-average molecular weight was 230,000.

COMPARATIVE EXAMPLE 7

The procedure of EXAMPLE 10 was repeated till cutting the maleimide-based copolymer having strand form to make it into pellet form. Thereafter, the resultant maleimide-based copolymer pellets having a temperature of 195° C. were stood without cooling. Thereby comparative maleimide-based copolymer pellets (2) were obtained.

The comparative maleimide-based copolymer pellets (2) were transparent and had cylindrical form. Their color tone was brown and weight-average molecular weight was 140,000.

COMPARATIVE EXAMPLE 8

The procedure of EXAMPLE 10 was repeated till extruding the maleimide-based copolymer into strand form. Thereafter, the resultant maleimide-based copolymer strands were cooled to 260° C. by air-cooling. However, because the cooling temperature of the strands was too high, the copolymer adhered to a strand cutter, so that operation could not be carried out in stable condition.

The cooled strands were cut by a strand cutter to make them into pellet form.

The resultant pellets were compulsively cooled to 65° C. by air-cooling for 5 minutes. Thereby comparative maleimide-based copolymer pellets (3) were obtained.

The comparative maleimide-based copolymer pellets (3) were opaque and adhered to each other. Color tone of the pellets was light yellow and weight-average molecular weight was 220,000.

The amount of volatile components, weight-average molecular weight, thermal deterioration, outside appearance and molecular weight-retention ratio for the above-obtained maleimide-based copolymer pellets (1) and (2) and comparative maleimide-based copolymer pellets (1) to (3) were analyzed in a manner similar to the aforementioned, and results therefrom were shown in Table 4. Also, the kind and proportion of monomer units in structure of these copolymers were analyzed in a manner similar to the aforementioned, so that any copolymer had a structure composed of 46 wt. % of the styrene unit and 54 wt. % of the N-phenylmaleimide unit.

TABLE 3

| | kind of copolymer composition | supplying temperature of copolymer composition (°C.) | supplying rate of copolymer composition (kg/h) | vent pressure (mmHg) rear vent | 1 | 2 | 3 | barrel-setting temperature (°C.) | screw rotation number (rpm) | injection of inactive liquid | kind of obtained maleimide-based copolymer |
|---|---|---|---|---|---|---|---|---|---|---|---|
| EXAMPLE 10 | (A) | 240 | 47 | 700 | 250 | 20 | 20 | 270 | 120 | yes | (1) |
| EXAMPLE 11 | (A) | 240 | 47 | 700 | 250 | 20 | 20 | 270 | 120 | yes | (2) |
| COMPARATIVE EXAMPLE 6 | (A) | 240 | 47 | 700 | 250 | 20 | 20 | 270 | 120 | yes | comparative (1) |
| COMPARATIVE EXAMPLE 7 | (A) | 240 | 47 | 700 | 250 | 20 | 20 | 270 | 120 | yes | comparative (2) |
| COMPARATIVE EXAMPLE 8 | (A) | 210 | 47 | 700 | 250 | 20 | 20 | 270 | 120 | yes | comparative (3) |

TABLE 4

| kind of maleimide-based copolymer pellets | amount of volatile components (ppm/copolymer) | | | | weight-average molecular weight (Mw/10⁴) | Izod impact strength value (kg.cm/cm) | outside appearance | molecular weight-retention ratio (%) |
|---|---|---|---|---|---|---|---|---|
| | solvent | ST | PMI | total | | | | |
| (1) | 160 | 140 | <50 | 300 | 23 | 1.6 | cylindrical light yellow transparent | 100 |
| (2) | 170 | 140 | <50 | 310 | 23 | 1.6 | cylindrical | 98 |

TABLE 4-continued

| kind of maleimide-based copolymer pellets | amount of volatile components (ppm/copolymer) | | | | weight-average molecular weight (Mw/10⁴) | Izod impact strength value (kg.cm/cm) | outside appearance | molecular weight-retention ratio (%) |
| --- | --- | --- | --- | --- | --- | --- | --- | --- |
| | solvent | ST | PMI | total | | | | |
| comparative (1) | 170 | 150 | <50 | 320 | 23 | 1.6 | light yellow transparent cracked | 99 |
| comparative (2) | 160 | 140 | <50 | 300 | 14 | 1.2 | light yellow opaque cylindrical brown | 99 |
| comparative (2) | 160 | 130 | <50 | 290 | 22 | 1.5 | transparent pellets adhered to each other light yellow transparent | 100 |

What is claimed is:

1. A maleimide-based copolymer consisting essentially of 35 to 70 wt. % of aromatic vinyl-based monomer units, 30 to 65 wt. % of maleimide-based monomer units and 0 to 20 wt. % other monomer units selected from the group consisting of unsaturated nitrile, (meth)acrylic acid ester, vinyl halogenide, vinyl ether, vinyl ester, allyl ester, (meth)allyl ester, polyvalent (meth)acrylate, polyvalent allylate, glycidyl (meth)acrylate, allyl glycidyl ether, (meth)acrylic acid, itaconic acid, maleic acid, and fumaric acid or half esters of these acids, and having a glass transition temperature of 170° C. or higher, a weight-average molecular weight in a range of 100,000 to 500,000, and a molecular weight-retention ratio of 90% or more when heated at 280° C. for 10 minutes.

2. A maleamide-based copolymer as claimed in claim 1, wherein said other monomer units are selected from unsaturated nitrile.

3. A maleamide-based copolymer as claimed in claim 1, wherein said other monomer units are selected from acrylonitrile, methacrylonitrile, ethacrylonitrile and phenylacrylonitrile.

4. The maleimide-based copolymer as claimed in claim 1, wherein said copolymer is extruded with a screw rotation number between 50 and 150 rpm.

5. A maleimide-based copolymer as claimed in claim 1, wherein the aromatic vinyl-based monomer units have the formula

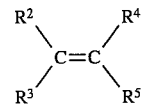

wherein each of $R^2$, $R^3$ and $R^4$ independently denotes a hydrogen atom or $C_1$–$C_5$ alkyl group and $R^5$ denotes an aryl or substituted aryl group.

6. A maleimide-based copolymer as claimed in claim 5, wherein the aromatic vinyl-based monomer units are styrene units.

7. A maleimide-based copolymer as claimed in claim 1, wherein the maleimide-based monomer units have the formula

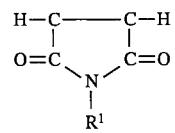

wherein $R^1$ denotes a hydrogen atom or an alkyl, cycloalkyl, substituted alkyl, aryl or substituted aryl group.

8. A maleimide-based copolymer as claimed in claim 7, wherein $R^1$ is phenyl.

9. A maleimide-based copolymer as claimed in claim 1, which contains 2000 ppm or less of volatile components.

10. A maleimide-based copolymer as claimed in claim 9, which contains 1000 ppm or less of volatile components.

* * * * *